United States Patent
Fairy (10) Patent No.: US 7,172,411 B2
(45) Date of Patent: Feb. 6, 2007

(54) INJECTION MOLDING MANIFOLD WITH MULTI-AXIS ADJUSTABLE MANIFOLD BLOCKS AND NOZZLES

(75) Inventor: Fabrice Fairy, Georgetown (CA)

(73) Assignee: Mold-Masters Limited, Georgetown (CA)

(*) Notice: Subject to any disclaimer, the term of this patent is extended or adjusted under 35 U.S.C. 154(b) by 407 days.

(21) Appl. No.: 10/871,684

(22) Filed: Jun. 18, 2004

(65) Prior Publication Data

US 2004/0258796 A1 Dec. 23, 2004

Related U.S. Application Data

(60) Provisional application No. 60/479,907, filed on Jun. 20, 2003.

(51) Int. Cl.
B29C 45/22 (2006.01)

(52) U.S. Cl. .................. 425/570; 425/572; 425/574

(58) Field of Classification Search ............ 425/567, 425/570, 572
See application file for complete search history.

(56) References Cited

U.S. PATENT DOCUMENTS

| | | |
|---|---|---|
| 2,871,517 A | 2/1959 | Allard |
| 3,677,682 A | 7/1972 | Putkowski |
| 4,082,324 A | 4/1978 | Obrecht |
| 4,289,335 A | 9/1981 | Olbermann |
| 4,468,191 A | 8/1984 | Gellert |
| 4,579,520 A | 4/1986 | Gellert |
| 4,702,689 A | 10/1987 | Schmidt et al. |
| 4,761,343 A | 8/1988 | Gellert |
| 4,793,795 A | 12/1988 | Schmidt et al. |
| 4,810,184 A | 3/1989 | Gellert et al. |
| 4,979,892 A | 12/1990 | Gellert |
| 5,000,675 A | 3/1991 | Gellert et al. |
| 5,227,179 A | 7/1993 | Benenati |
| 5,366,370 A | 11/1994 | Gellert |
| 5,540,580 A | 7/1996 | Takada |
| 5,707,664 A | 1/1998 | Mak |
| 5,955,121 A * | 9/1999 | Gellert et al. ............ 425/570 |

(Continued)

FOREIGN PATENT DOCUMENTS

AU 452 137 B 3/1973

(Continued)

OTHER PUBLICATIONS

Mold-Master® Presents 2 New MasterSOLUTION? Technologies for Hot Runner Molding or visist www.moldmaster.com, Jun. 23, 2003.

(Continued)

*Primary Examiner*—Tim Heitbrink
(74) *Attorney, Agent, or Firm*—Ridout & Maybee LLP (57) ABSTRACT

An injection molding apparatus has a manifold and a plurality of first and second adjustable manifold blocks. The second manifold blocks are in fluid communication and are directly connected to a hot runner nozzle. The second manifold blocks are coupled to the first manifold blocks via connector devices. These connector devices contain a melt channel and allow the second manifold blocks and therefore the hot runner nozzles to be rotated relative to the first manifold blocks around at least two axes. This allows the nozzles to be positioned in front of mold gates that are located at variable elevations with respect to the manifold.

20 Claims, 7 Drawing Sheets

U.S. PATENT DOCUMENTS 6,461,140 B1    10/2002    Bosg et al.

FOREIGN PATENT DOCUMENTS

| EP | 0 162 412 A2 | 11/1985 |
| EP | 0 709 174 A1 | 5/1996 |
| JP | 08309821 | 11/1998 |

OTHER PUBLICATIONS

Schmidt H: "Ein Raster, das Keinen Wunsch offenläβt" Plastverarbeiter, Zechner und Huethig Verlag GMBH. Speyer/Rhein, DE, vol. 38, No. 12, Dec. 1987, pp. 98-99, 102, XP001176320.

* cited by examiner

INJECTION MOLDING MANIFOLD WITH MULTI-AXIS ADJUSTABLE MANIFOLD BLOCKS AND NOZZLES

CROSS-REFERENCE TO RELATED APPLICATION

This application claims the benefit under 35 U.S.C. § 119(e) of provisional U.S. Appl. No. 60/479,907 filed Jun. 20, 2003, the content of which is incorporated by reference herein in its entirety.

BACKGROUND OF THE INVENTION

1. Field of the Invention

The present invention relates generally to an injection molding apparatus and, in particular, to a non-linear multi-cavity injection molding apparatus having several position and or angle adjustable manifold blocks and nozzles.

2. Related Art

Injection molding systems may be made out of a single block or single piece manifold and this may be called a unitary manifold. Also the injection molding systems are in some instances made out of a manifold assembly that includes several identical or almost identical manifold blocks that are connected or linked between them in several ways. These multi block manifolds do not include means to vary the angular position between the manifold blocks and thus the angular position of the nozzles coupled to these manifolds cannot be adjusted.

Injection molding is being used to make larger and larger components, particularly in the automotive industry. In addition to considerably increasing the size of the melt channel and the length of the nozzles, this has led to the use of systems in which several nozzles extend from an elongated manifold made of a single manifold block or several manifold blocks to a single mold cavity. Further, the part shapes are often complex which requires the mold gates that delimit the mold cavity to be located at varying heights and angles relative to the manifold.

In order to accommodate multiple nozzles extending at different angles relative to the manifold, a high level of tooling accuracy in the mold is necessary. In some applications, nozzles were simply bolted at different angles into place on a side of the manifold. Some of these known solutions typically included manifolds and nozzles that were custom designed for each application, which had the further disadvantage that set up was often difficult and time consuming.

SUMMARY OF THE INVENTION

According to an embodiment of the present invention there is provided an injection molding apparatus including a first manifold block having a first manifold melt channel for receiving a melt stream of moldable material from a source, a second manifold block having a second manifold melt channel for receiving the melt stream from the first manifold melt channel, and a nozzle coupled to an outlet of the second manifold block. The nozzle includes a nozzle channel for receiving the melt stream from the second manifold melt channel. The nozzle channel communicates with a mold cavity for receiving the melt stream from the nozzle through a mold gate. A connector assembly couples the first manifold block to the second manifold block. The connector assembly includes a melt channel for allowing melt to flow between the first manifold melt channel and the second manifold melt channel. The angle of the second manifold block is adjustable together with the nozzle relative to the first manifold block.

According to another embodiment of the invention, the distance between the second manifold block and the first manifold block can be adjusted via a slidable connection that allows the nozzle to accurately reach the mold gates and compensate for the thermal expansion.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
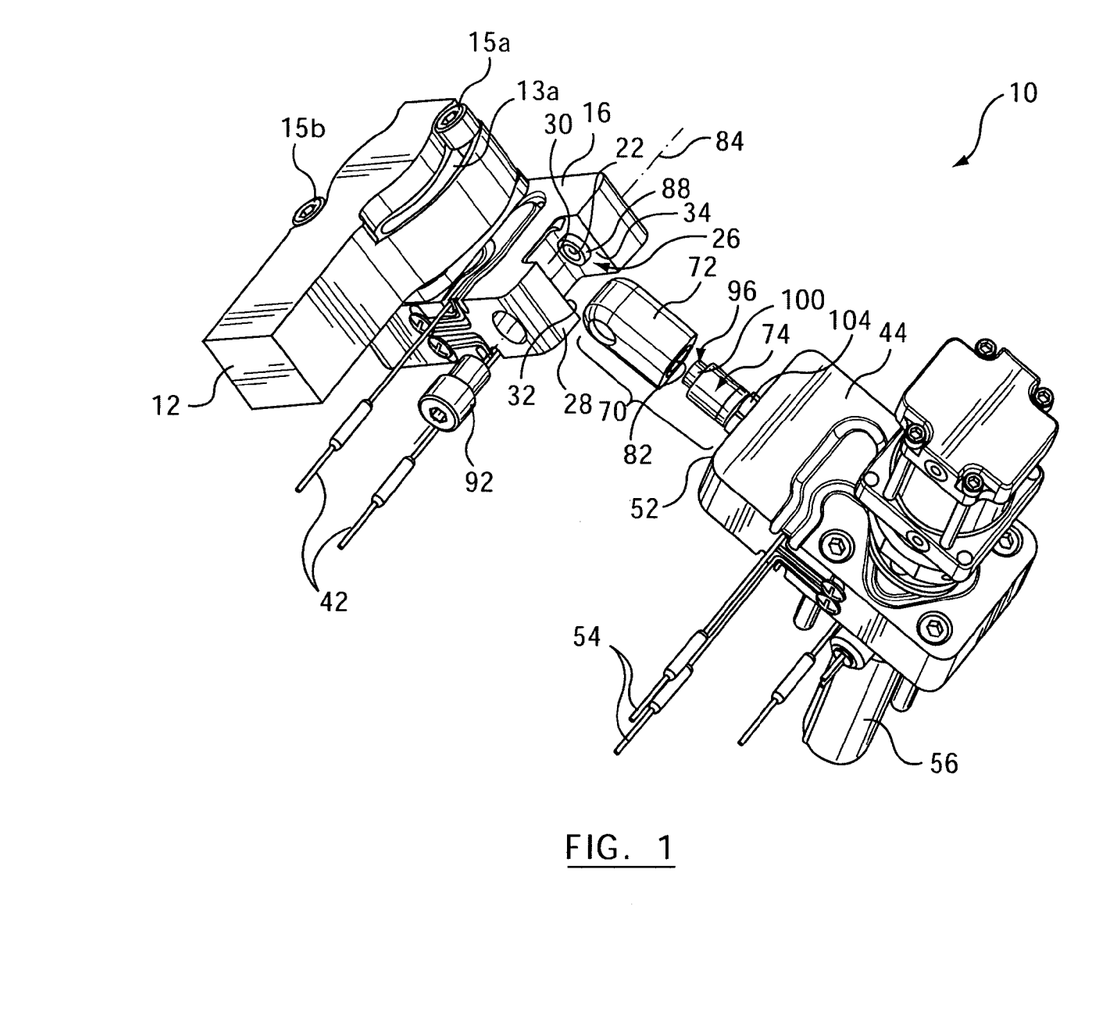
FIG. 1 is an exploded isometric view of portions of an injection molding apparatus according to an embodiment of the present invention.
Figure 2:
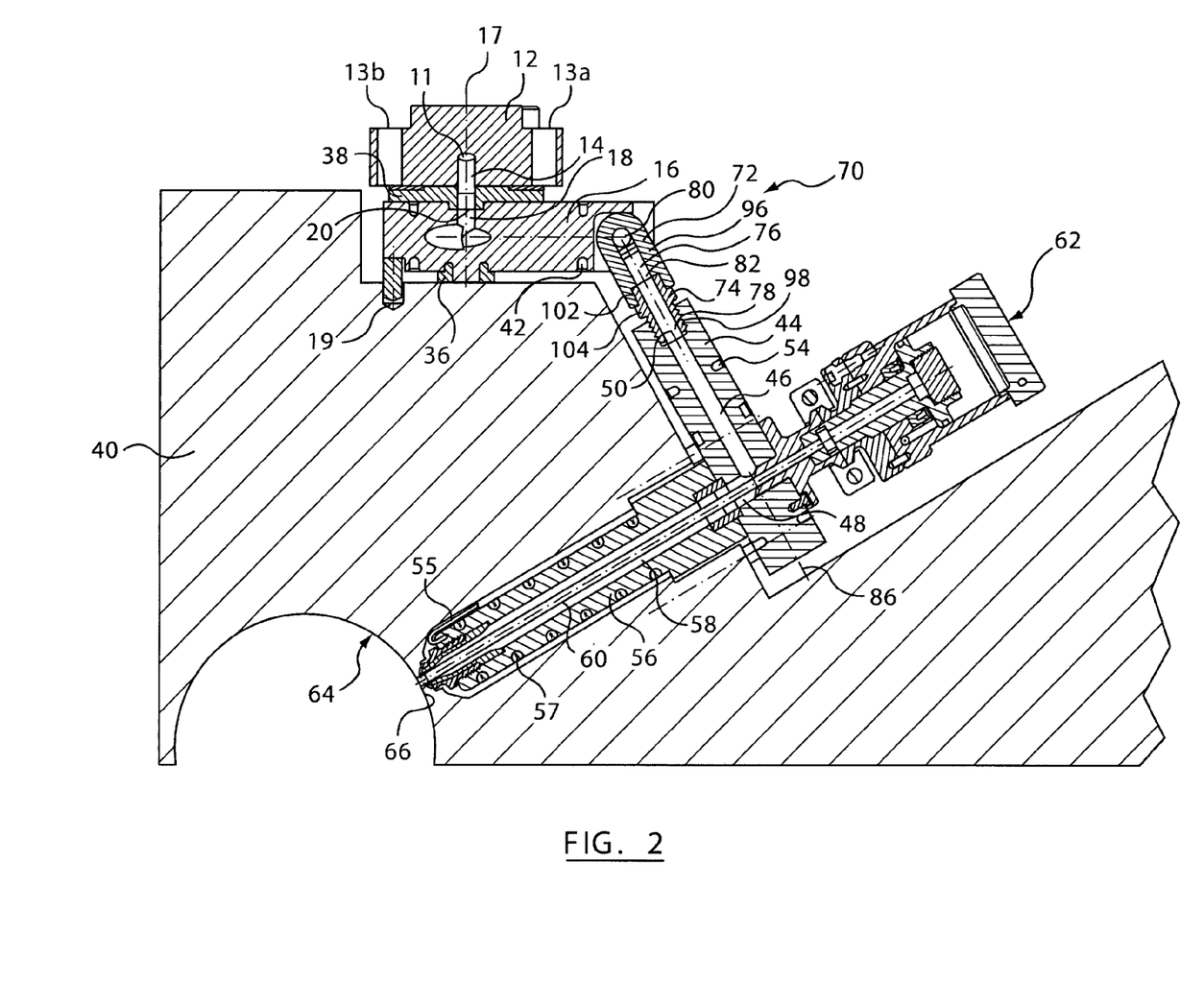
FIG. 2 is a side sectional view of the apparatus of FIG. 1 in a mold.

Referring now to FIGS. 1 and 2, an injection molding apparatus 10 includes a manifold 12, a first manifold block 16 and a second manifold block 44. A valve gated nozzle 56 is coupled to the second manifold block 44. A connector assembly 70, which will be described in detail later, is provided to couple the second manifold block 44 to the first manifold block 16.

The manifold 12 includes a manifold melt channel 11 for receiving a melt stream of moldable material from a melt source (not shown) through an inlet thereof (not shown). The manifold 12 further includes an outlet 14 for delivering the melt stream to the first manifold block 16. Manifold 12 further includes a pair of opposed and semi-circular slots 13a and 13b through which screws 15a and 15b extend, respectively, to connect manifold 12 to first manifold block 16. By slightly unscrewing screws 15a and 15b with respect to the upper surface of slots 13a and 13b, first manifold block 16 may be rotated relative to manifold 12 about an axis 17.

The first manifold block 16 includes a first manifold melt channel 18 having an inlet 20. The inlet 20 is aligned with the outlet 14 of the manifold melt channel 11 to receive the melt stream therefrom. A locating bushing 38 is provided between the first manifold block 16 and the manifold 12 to locate the parts relative to one another. The first manifold block 16 is further located relative to a mold plate 40 by a locating ring 36. First manifold block 16 is coupled to mold plate 40 through rod 19.

The first manifold block 16 includes a cut-out portion 26 that is provided in a side 28 thereof, as seen in FIG. 1, for example. The cut-out portion 26 includes a first wall 30 that is offset from the side 28 and a pair of second walls 32, 34 that extend generally perpendicular to the first wall 30. An outlet 22 of the first manifold melt channel 18 is provided in the second wall 34.

Figure 3:
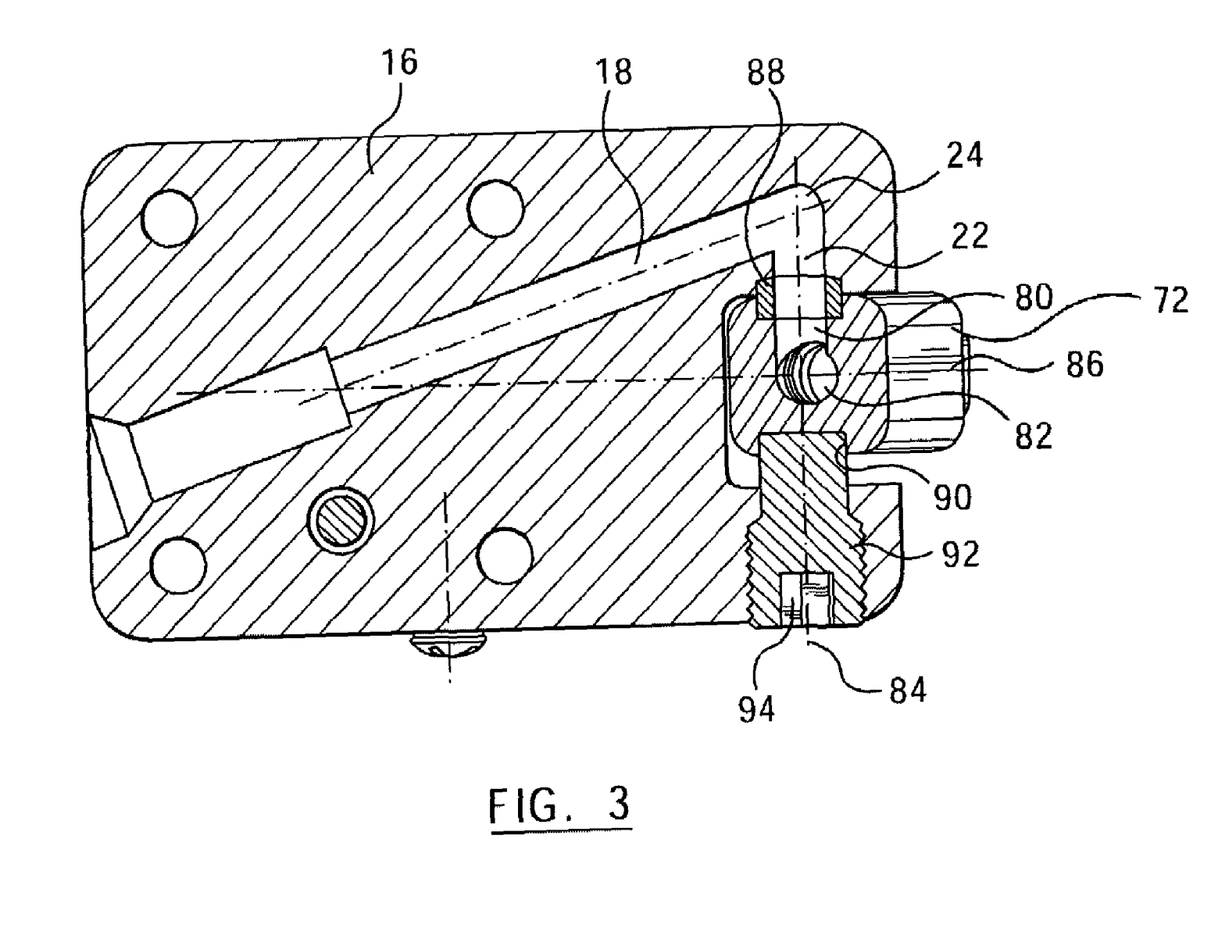
FIG. 3 is a sectional plan view of a portion of FIG. 2.

As shown in FIG. 3, the first manifold melt channel 18 of the first manifold block 16 includes a bend 24 that is provided between the inlet 20 and the outlet 22 thereof. The bend 24 allows the melt stream to enter a connector assembly 70 (a portion of which is shown in FIG. 3), as described in detail below, from a side thereof.

The connector assembly 70 includes a first connector 72 and a second connector 74. The first connector 72 includes a melt channel 76 having an inlet portion 80 and an outlet portion 82. The inlet portion 80 is aligned with a first axis 84 and the outlet portion 82 is aligned with a second axis 86, which is generally perpendicular to the first axis 84. The inlet portion 80 of the first connector 72 is coupled to the outlet 22 of the first manifold melt channel 18 by a bushing 88. The bushing 88 allows the first connector 72 to rotate relative to the first manifold block 16 about the first axis 84.

A locking device 92 extends through second wall 32 of the first manifold block 16 to engage a seat 90, which is provided in the first connector 72, opposite the inlet portion 80. The locking device 92 includes an aperture 94 that is shaped to receive a tool. By locking the locking device 92, rotation of the first connector 72 relative to the first manifold block 16 is prevented.

The second connector 74 is generally a bushing having a first end 96, a second end 98 and a melt channel 78 extending therethrough. The first end 96 includes a reduced diameter portion 100, which is received in the outlet portion 82 of the melt channel 76. An outer cylindrical surface 102 of the reduced diameter portion 100 is generally smooth to allow for relative rotation about the second axis 86 between the first connector 72 and the second connector 74. The smooth connection also allows for relative sliding due to thermal expansion between the first connector 72 and the second connector 74.

The second manifold block 44 includes a threaded recess 50 that is provided in a side 52 thereof for receiving the second connector 74, which is generally a bushing. The second end 98 of the second connector 74 is threaded in order to mate with the threaded recess 50. The second connector 74 further includes an enlarged hexagonal shaped portion 104, which is engagable by a tool.

It will be appreciated by persons skilled in the art that the second connector 74 could be coupled to the second manifold block 44 in an alternative manner. Further, the second connector 74 could be integral with the second manifold block 44.

The second connector 74 is aligned with a second manifold melt channel 46, which extends through the second manifold block 44. An outlet 48 of the second manifold melt channel 46 is aligned with a nozzle channel 58 of the nozzle 56. The nozzle channel 58 communicates with a mold cavity 64 through a mold gate 66. The mold gate 66 is selectively openable by valve pin 60, which extends through the nozzle channel 58. The valve pin 60 is actuable by a self-supporting actuating mechanism 62, which is described in U.S. Pat. No. 4,979,892 to Gellert, the contents of which are herein incorporated by reference in its entirety.

The first and second manifold blocks 16, 44, and nozzle 56 are heated by heating elements 42, 54, and 57, respectively. A thermocouple 55 is also provided to monitor the temperature of the melt stream in the nozzle channel 58. Manifold 12 is also heated by a heating element (not shown).

Operation of the injection molding apparatus 10 according to the present invention will now generally be described. During installation, the locking device 92 of the first connector 72 is loosened and the first connector 72 is rotated about the first axis 84 until the desired angle between the first manifold block 16 and the second manifold block 44 is reached. Once the desired angle has been reached, the locking device 92 is locked.

The second manifold block 44 rotates and slides freely about the second axis 86. The second manifold block 44 is thus positioned relative to the mold gate 66 without locking it into place. This allows for the distance and angle between the first manifold block 16 and the second manifold block 44 to be constantly adjustable in order to maintain good nozzle-gate alignment and accommodate thermal expansion.

Once the components have been adjusted to suit the particular molding application, the injection molding apparatus is heated to an operating temperature and the melt stream flows under pressure through the manifold melt channel 11 of the manifold 12 and into first manifold melt channel 18 of the first manifold block 16. From the first manifold melt channel 18, the melt flows into the melt channel 76 of the first connector 72 of the connector assembly 70 and into the melt channel 78 of the second connector 74. From the connector assembly 70, the melt stream continues to flow through the second manifold melt channel 46 and into the nozzle channels 58 of a plurality of nozzles 56. The melt stream then flows past the mold gates 66 and into the mold cavities 64. The mold cavities 64 are then cooled by the coolant flowing through cooling ducts (not shown) in the mold plate 40. Once a predetermined amount of time has elapsed, the molded parts are ejected from the mold cavities 64.

In a second embodiment, the second manifold block 44 is connected directly to the manifold 12. In this arrangement, the manifold 12 receives the second connector 74 and the first connector 72 is coupled to the second manifold block 44.

Figure 4:
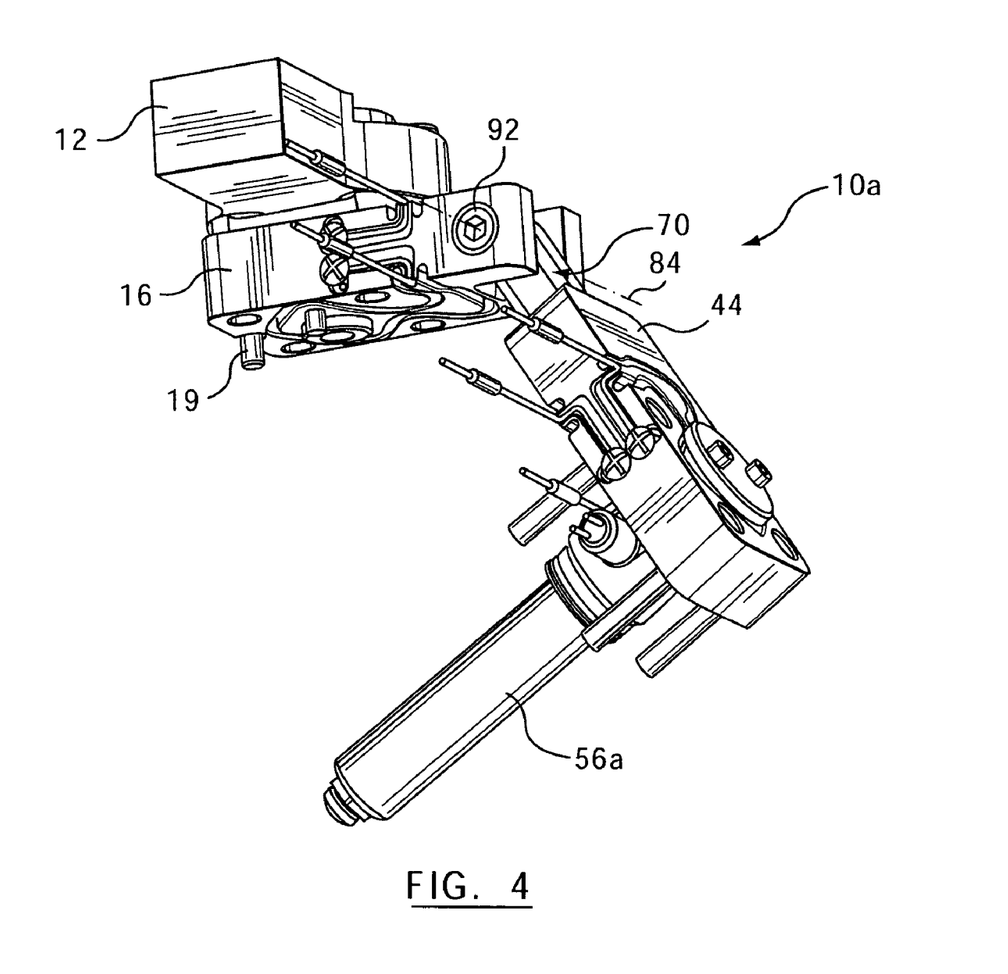
FIG. 4 is an isometric view of portions of an injection molding apparatus according to another embodiment of the present invention.
Figure 5:
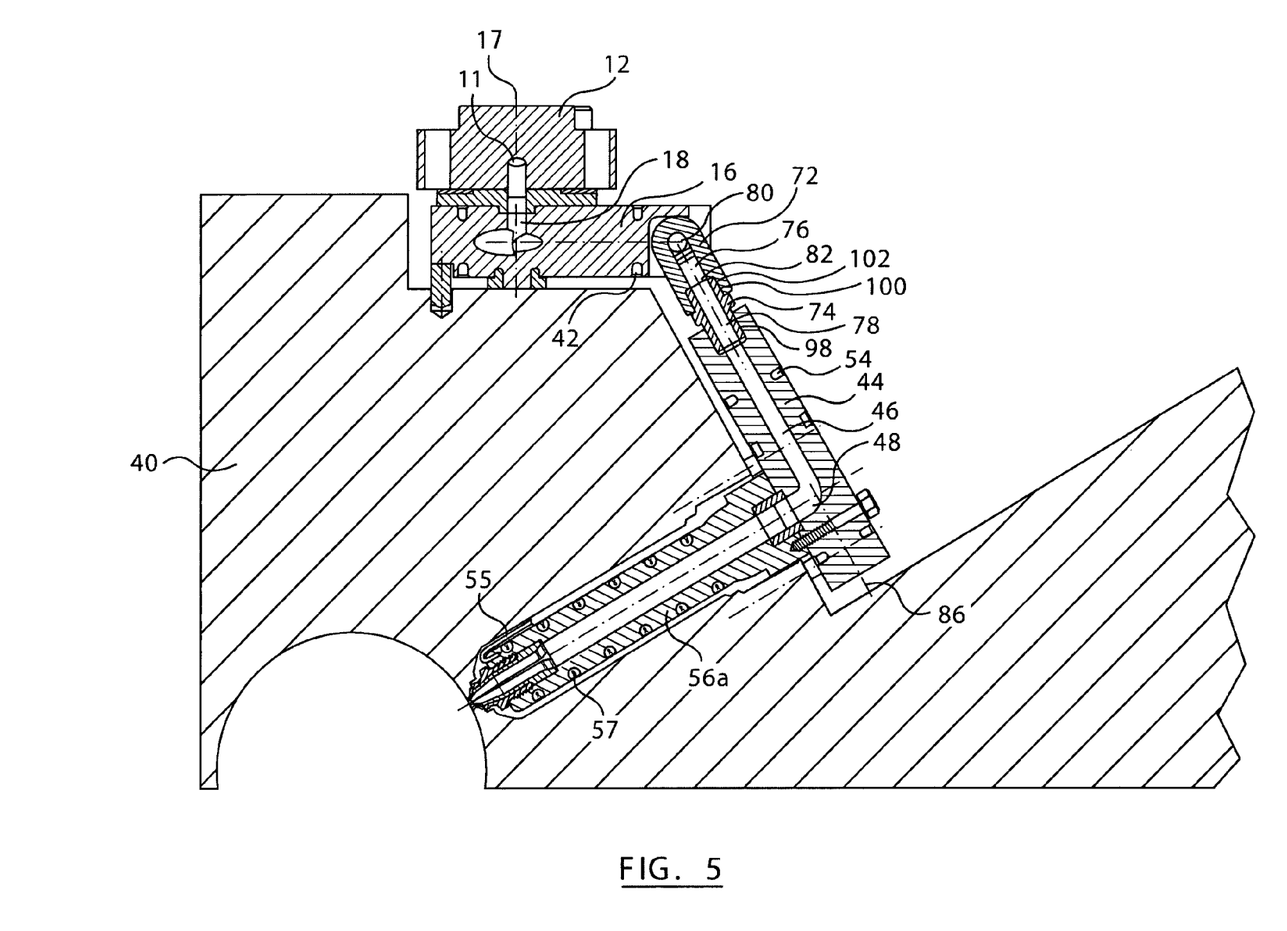
FIG. 5 is a side sectional view of the apparatus of FIG. 4 in a mold.

Referring now to FIGS. 4 and 5, another embodiment of an injection molding apparatus 10a is generally shown in which like reference numerals indicate like parts. The injection molding apparatus 10a is similar to the injection molding apparatus 10 shown FIGS. 1–3, however, nozzle 56a is not valve gated. Instead, the nozzle 56a is thermal gated. Thermal gated nozzles are well known in the art and therefore will not be described further herein.

With the exception of the nozzle 56a, all of the parts of the injection molding apparatus 10a are generally identical to those of the injection molding apparatus 10, and therefore will not be described.

Figure 6:
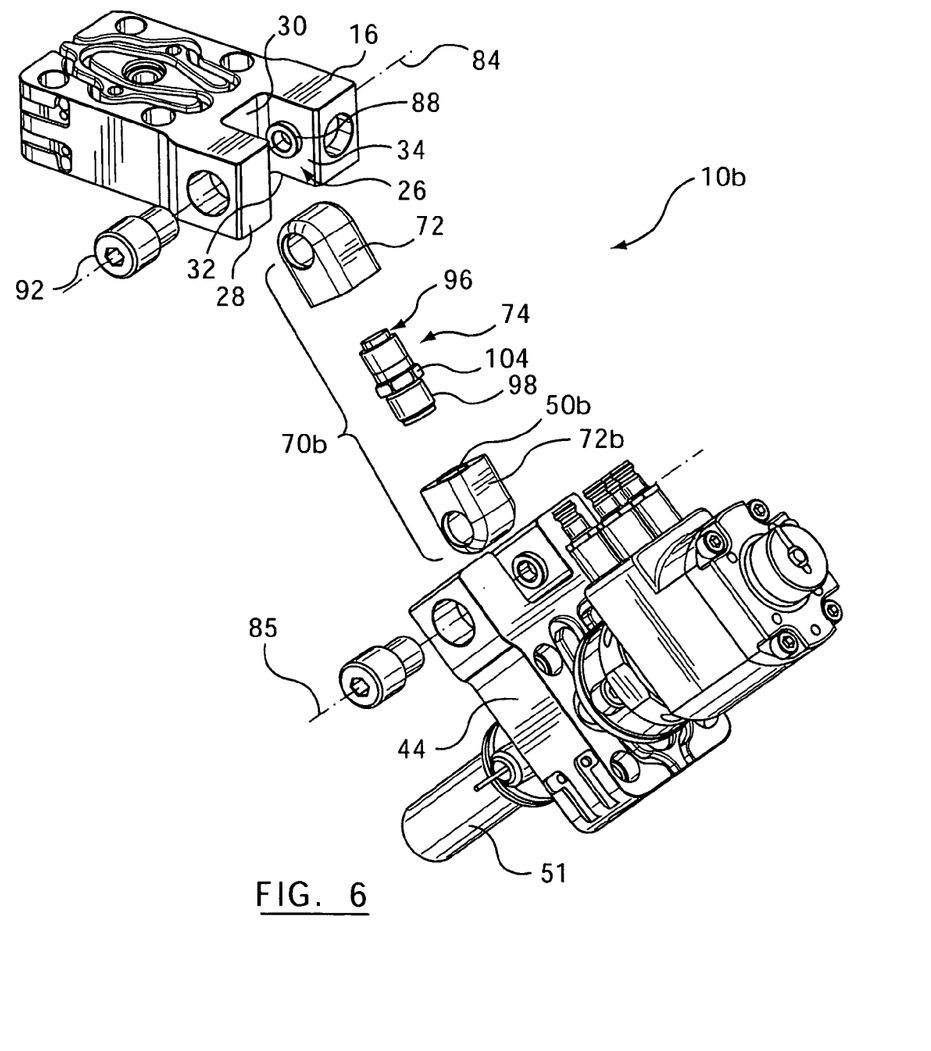
FIG. 6 is an exploded isometric view of portions of an injection molding apparatus according to another embodiment of the present invention.

Referring now to FIG. 6, another embodiment of injection molding apparatus 10b is generally shown in which like reference numerals indicate like parts. The injection molding apparatus is similar to the injection molding apparatus 10 shown in FIGS. 1–3 however; connector assembly 70b is comprised of three connectors. The first two portions of the connector assembly 70b are identical to connector assembly 70 shown in injection molding apparatus 10, however the second end 98 of the second connector 74 is threaded in order to mate with the threaded recess 50b located in a third connector 72b which is identical to the first connector 72. The third connector 72b is mated with the second manifold block 44 in the same manner as the first connector 72 and the first manifold block 16. This embodiment allows for an additional rotation of the second manifold block about an axis 85.

Figure 7:
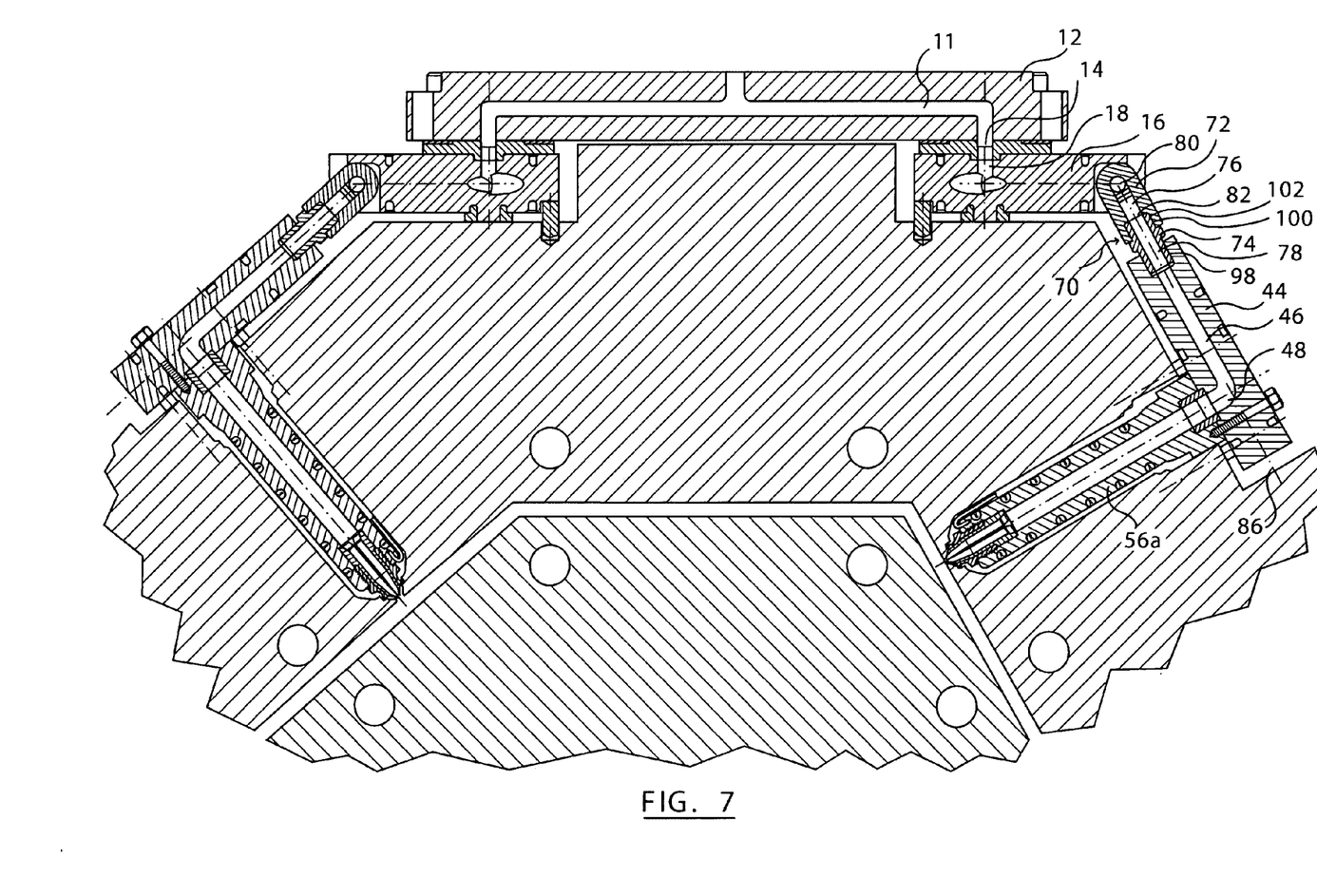
FIG. 7 is side sectional view of an embodiment of the present invention including a plurality of nozzles, manifold blocks, and connection assemblies.

FIG. 7 shows the environment in which the invention described above is generally used. FIG. 7 shows manifold 12 including a manifold melt channel 11. A plurality of first manifold blocks 16 are coupled to manifold 12 such that the first manifold melt channel 18 of each is aligned with the outlets 14 of the manifold 12. Coupled to each first manifold block 16 is a connector assembly 70 and second manifold block 44, and a nozzle 56/56a, as described in detail above. It would be recognized by those skilled in the art that the variations discussed above with respect to the embodiments can be applied FIG. 7, without deviating from the spirit and scope of the invention.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a first manifold block having a first manifold melt channel for receiving a melt stream of moldable material from a source;
   a second manifold block having a second manifold melt channel for receiving said melt stream from said first manifold melt channel;
   a nozzle coupled to said second manifold block, said nozzle having a nozzle melt channel for receiving said melt stream from said second manifold melt channel;
   a mold cavity receiving said melt stream from said nozzle, said nozzle channel communicating with said mold cavity through a mold gate; and
   a connector assembly for coupling said first manifold block to said second manifold block, said connector assembly having a melt channel for allowing melt to flow between said first manifold melt channel and said second manifold melt channel,
   wherein said second manifold block is rotatable relative to said first manifold block about a first axis and about a second axis.

2. The injection molding apparatus as claimed in claim 1, wherein said first axis is perpendicular to a longitudinal axis of said connector assembly.

3. The injection molding apparatus as claimed in claim 2, wherein said second axis is substantially coaxial with said melt channel of said connector assembly.

4. The injection molding apparatus as claimed in claim 1, wherein said second axis is substantially coaxial with said melt channel of said connector assembly.

5. The injection molding apparatus as claimed in claim 1, further comprising a manifold having a manifold melt channel, wherein said first manifold block is coupled to said manifold such that said first manifold block is rotatable relative to said manifold about a third axis, and wherein an inlet of said first manifold melt channel is aligned with an outlet of said manifold melt channel.

6. The injection molding apparatus as claimed in claim 5, wherein said connector assembly includes a first connector and a second connector, said first connector including a first connector melt channel in communication with said first manifold melt channel and said second connector including a second connector melt channel in communication with said second manifold melt channel, said first connector being rotatable relative to said second connector about said second axis.

7. The injection molding apparatus as claimed in claim 6, wherein said first connector is rotatable relative to said first manifold block about said first axis.

8. The injection molding apparatus as claimed in claim 7, wherein said first connector is slidable relative to said second connector along said second axis.

9. The injection molding apparatus as claimed in claim 8, wherein said second connector is a bushing that threadably engages said second manifold block.

10. The injection molding apparatus as claimed in claim 9, wherein said first manifold melt channel in said first manifold block is offset to enter said first connector at an angle.

11. The injection molding apparatus as claimed in claim 1, wherein said connector assembly includes a first connector and a second connector, said first connector including a first connector melt channel in communication with said first manifold melt channel and said second connector including a second connector melt channel in communication with said second manifold melt channel, said first connector being rotatable relative to said second connector about said second axis.

12. The injection molding apparatus as claimed in claim 11, wherein said first connector is rotatable relative to said first manifold block about said first axis.

13. The injection molding apparatus as claimed in claim 12, wherein said first connector is slidable relative to said second connector along said second axis.

14. The injection molding apparatus as claimed in claim 13, wherein said second connector is a bushing that threadably engages said second manifold block.

15. The injection molding apparatus as claimed in claim 14, wherein said first manifold melt channel in said first manifold block is offset to enter said first connector at an angle.

16. The injection molding apparatus as claimed in claim 1, wherein said connector assembly includes a first connector coupled with said first manifold block, a second connector coupled with said first connector and a third connector, said third connector being coupled with said second manifold block.

17. The injection molding apparatus as claimed in claim 16, wherein said first connector is rotatable relative to said second connector about said second axis.

18. The injection molding apparatus as claimed in claim 16, wherein said first connector is slidable relative to said second connector along said second axis.

19. The injection molding apparatus as claimed in claim 16, wherein said first connector is rotatable relative to said first manifold block about said first axis, said second connector is rotatable relative to said first connector about said second axis and said second manifold block is rotatable relative to said third connector about a third axis.

20. An injection molding apparatus as claimed in claim 16, wherein said second connector is a bushing that threadably engages said third connector.

* * * * *